July 22, 1969     J. A. BERBERIAN ET AL     3,456,856

CUTTING TOOL

Filed Sept. 20, 1967     2 Sheets-Sheet 1

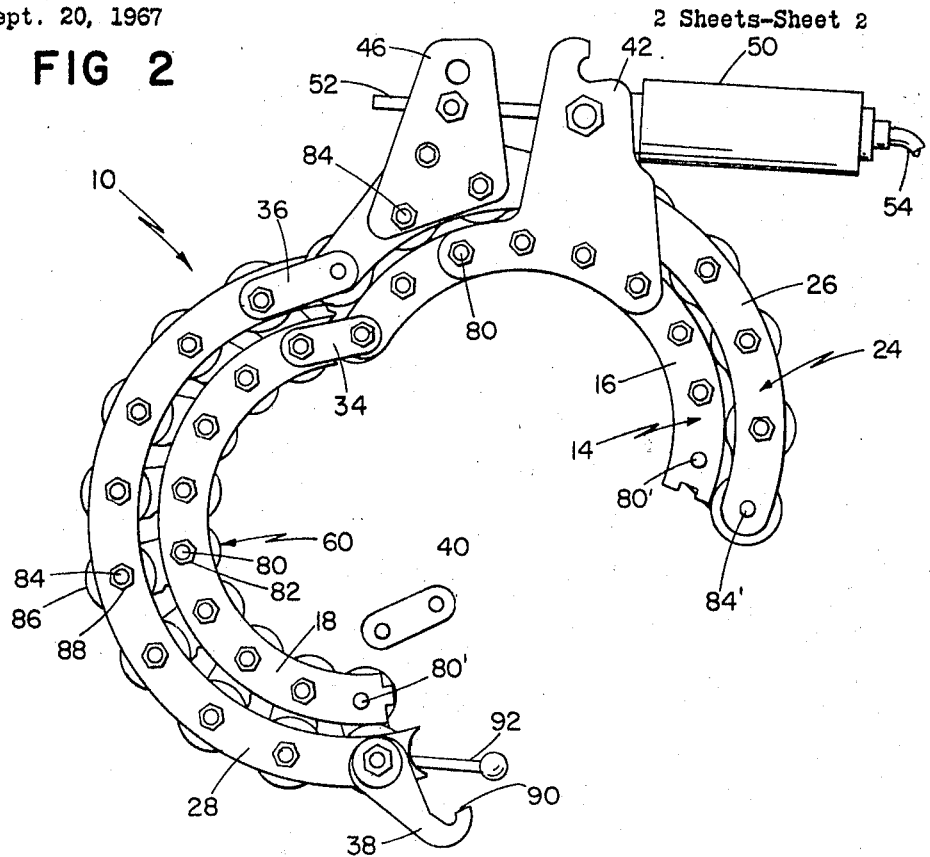
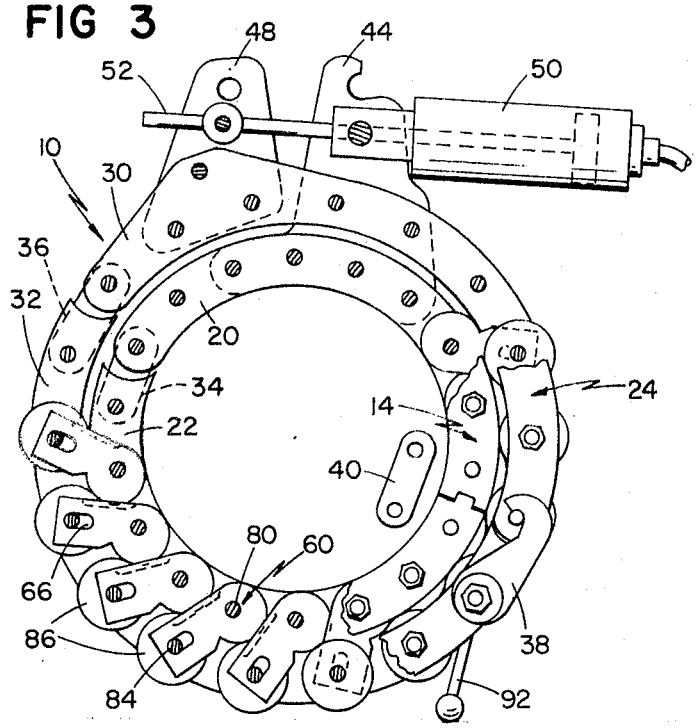
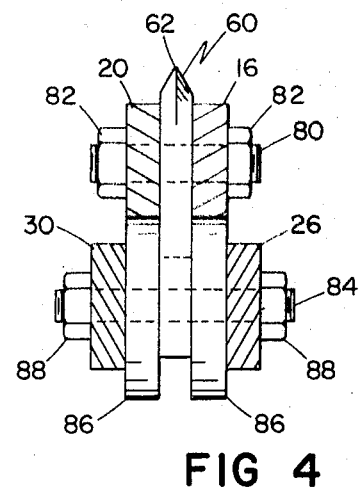

United States Patent Office 3,456,856
Patented July 22, 1969

3,456,856
CUTTING TOOL
John A. Berberian, 4 Elm Ave., Burlington, Mass. 01803, and Joseph G. Tringale, 65 Summer St., Medford, Mass. 02155
Filed Sept. 20, 1967, Ser. No. 669,176
Int. Cl. B65h 35/10, 3/08
U.S. Cl. 225—103                10 Claims

ABSTRACT OF THE DISCLOSURE

A pipe cutter for cutting large size pipe such as cast iron and ductile iron water pipe includes two inner and outer concentrically arranged ring structures on which are mounted eighteen identical cutters for cutting eight inch diameter pipe. Each cutter is pivoted on a shaft which extends through the inner ring structure and driven by a shaft which extends through the outer ring structure. Rollers carried by the shafts on the outer ring structure maintain the concentricity of the two ring structures. Each cutter has a V-shaped cutter edge 1⅝ inch diameter, the center of which is offset ⅜ inch from the pivot axis. When the cutter assembly is mounted on the pipe, a hydraulic cylinder rotates the outer ring structure relative to the inner ring structure to pivot the cutters and force their cutting edges into the pipe producing a smooth fracture in a cutting operation.

SUMMARY OF INVENTION

This invention relates to tools for parting a fracturable member and more particularly to a tool that is particularly useful in "cutting" pipe.

An object of the invention is to provide a novel and improved tool for cutting pipe and similar articles. Another object of the invention is to provide novel and improved apparatus for severing pipe in a controlled fracturing operation in a manner which does not introduce significant distortion to the end of the pipe as severed, thus providing a suitable end surface for connection to another length of similar pipe. Still another object of the invention is to provide a "pipe cutter" for large size pipe that is easy and reliable in operation and suitable for use in the field.

The pipe cutter of the invention features inner and outer coaxially disposed ring structures on which a plurality of cutters are disposed in a circle. Each cutter is pivotally mounted on one ring structure and coupled in driving relation to the other ring structure. Each cutter further includes a cutter edge that progressively protrudes further beyond one ring structure as one ring structure is rotated about the common axis relative to the other ring structure. The tool is disposed on the article to be cut and one ring structure is driven in rotation relative to the other ring structure to pivot the cutters and force the cutter edges into the article coaxially disposed with respect to the cutter assembly. The resulting relative rotation of the two ring structures imparts a uniform rolling (rotative) motion to each cutter and they make a series of indentions around the peripheral surface of the cylindrical article. The article is cut in a controlled fracturing operation quickly, and with minimum distortion to the edges of the article at which the fractures occur. The tool is compact and easy to operate.

Other objects, features and advantages of the invention will be seen as the following description of a particular embodiment progresses, in conjunction with the drawing in which:

FIG. 2 is an end of the apparatus of the invention in open position;

FIG. 3 is an end view of the apparatus shown in FIG. 2 in closed position, with parts removed or broken away for clarity;

FIG. 4 is a sectional view through the ring structures and a cutter element;

DESCRIPTION OF PARTICULAR EMBODIMENT

Figure 1:
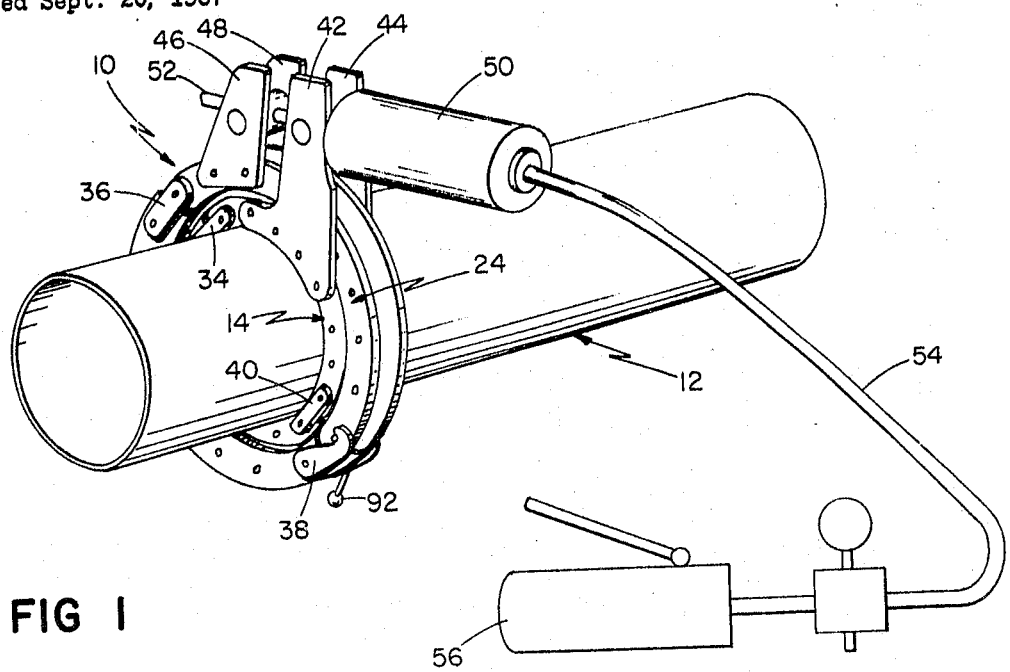
FIG. 1 is a perspective diagrammatic view of apparatus constructed in accordance with the invention in use in cutting a length of pipe into two shorter lengths.

With reference to FIG. 1, the tool 10 is mounted on a pipe 12, in this example the pipe being an 8 inch O.D. ductible iron, cement lined water pipe of ½ inch wall thickness. The tool 10 includes an inner ring structure 14 defined by four arcuate segments 16, 18, 20 and 22; and an outer ring structure 24 defined by four similar segments of larger radius 26, 28, 30 and 32. Links 34 hingedly connect the segments 16 and 18 and 20 and 22 of the inner ring structure 14 while links 36 function similarly to provide a hinge joint in the outer ring structure. Latch links 38 connect outer segments of outer ring structure 24 together and coupling links 40 are used to secure the arcuate segments of ring stucture 14 in encircling position about the pipe 12. Upstanding bracket arms 42, 44 are connected to the inner ring structure 14 while corresponding brackets arms 46, 48 are connected to the outer ring structure 24. Connected to arms 42, 44 is hydraulic cylinder 50 and its piston rod 52 is connected to arms 46, 48 attached to the outer ring. Fluid pressure, applied to cylinder 50 via hose 54 from hydraulic pump 56 produces relative rotation of ring structures 14 and 24.

Figures 5, 6:
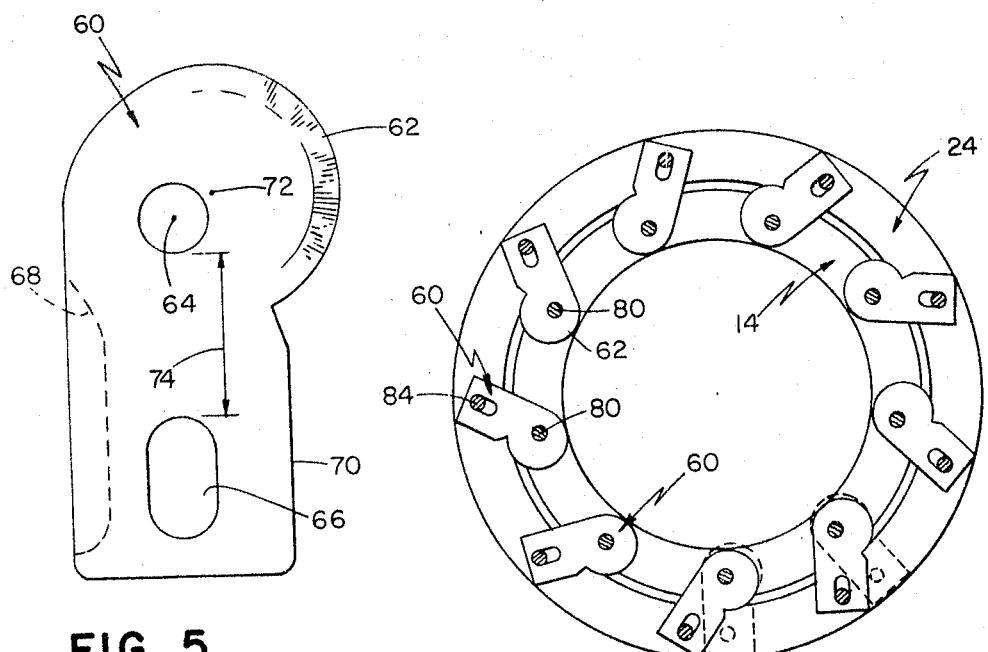
FIG. 5 is a side view of a cutter element employed in the apparatus shown in FIG. 2.
FIG. 6 is a diagram indicating the motion of the cutter elements in a pipe cutting operation.

Pivotally connected to ring structure 14 are a series of eighteen cutters 60 of configuration as indicated in FIGS. 4 and 5. Each cutter has a cutting edge 62, a pivot axis 64 and a slot 66. A recess 68, provided in the rear wall of the shank 70 of the cutter, receives a portion of the cutter edge 62 of the adjacent cutter as indicated in FIG. 3 and allows greater pivoting rotation of the cutters. The cutter edge 62 is V-shaped and has a diameter of 1⅝ inches about center 72. Pivot axis 64 is offset ⅜ inch from the center of radius 72 of cutter edge 62. The hole which defines pivot axis 64 is ⅝ inch in diameter, slot 66 is ⅝ inch wide and one inch long, and dimension 74 is 1⅜ inches long.

The cutters are assembled to ring structures 14 and 24 as indicated in FIGS. 2–4. Shafts 80 that are threaded at each end, pass through apertures 64 and similar holes in the arcuate segments that make up the inner ring and are secured in position by nuts 82. Similar threaded shafts 84 are received in slots 66. Mounted on shafts 84 on either side of the cutters 60 are spacer discs 86 which ride on the arcuate segments of the inner ring to maintain the concentricity of the two ring structures 14 and 24. Secured on either side of discs 86 are arcuate segments that make up the outer ring and the assembly is secured by nuts 88 received on the threaded ends of shafts 84. In addition, as indicated in FIG. 2, bracket arms 42, 44 are connected to four of the shafts 80 and bracket arms 46, 48 are connected to two of the shafts 84. Similarly, links 34 are mounted on two of shafts 80, and links 36 are mounted on two of adjacent shafts 84. The latch links 38 are eccentrically mounted on a shaft 84 and their tips 90 engage shaft 84′ and as the eccentric is rotated by handle 92, the latch links pull the ring structure 24 (carrying the inner ring system 14 with it) into circular position, where links 40 may be pressed on shafts 80′.

The position of the tool in open position is shown in FIG. 2 and the position of the tool in closed position is shown in FIG. 3.

In operation, the tool is positioned on the pipe to be cut and the arcuate segments are closed to complete the ring structures 14, 24 in the position shown in FIG. 3. Hydraulic pressure is then applied via pump 56 to cylinder 50 to move the outer ring system 24 relative to the inner ring system 14. This relative rotation causes the cutters 60 to pivot about axes 64 as driven by shafts 84 in engagement with the side walls of slots 66, towards the position indicated in dotted line in FIG. 6 and forces the cutting edges 62 into the pipe 12 to produce a series of equal indentations uniformly spaced around the pipe. These indentations produce a fracture which is clean and without significant indentation or damage to the cement lining of the pipe so that the severed pipe segment may be directly connected into a system.

While a particular embodiment of the invention has been shown and described, various modifications thereof will be obvious to those skilled in the art and therefore it is not intended that the invention be limited to the disclosed embodiment or to details thereof and departures may be made therefrom within the spirit and scope of the invention as defined in the claims.

What is claimed is:

1. A tool for cutting a cylindrical article comprising inner and outer coaxially arranged ring structures, a plurality of cutters secured between said two ring structures, each said cutter being pivotally mounted on a first ring structure and in driving engagement with the second ring structure and having a working edge adapted to protrude radially beyond one of said rings, the amount of protrusion of said cutter edge beyond said one ring structure varying as the function of the angular relation between the said inner and outer rings, and means to rotate one of said ring structures relative to the other ring structure about their common axis to vary the angular relation of said cutters to produce a series of indentations around the periphery of said cylindrical article for fracturing and parting said article.

2. The tool as claimed in claim 1 and further including auxiliary members coupled to one of said ring structures for maintaining the concentric relation of said inner and outer ring structures as said ring structures are rotated relative to one another.

3. The tool as claimed in claim 2 wherein said auxiliary members are discs mounted for movement with said outer ring and engaging said inner ring.

4. The tool as claimed in claim 1 and further including a hinge structure connecting segments of each said ring structure, and a latch structure for securing said segments together in ring configuration.

5. The tool as claimed in claim 1 wherein each said cutter is pivotally connected to the inner ring structure and said cutter edge defines a curve of uniformly increasing radius with respect to the axis of that pivot connection.

6. The tool as claimed in claim 1 wherein each said cutter is linked in driving engagement to said other ring structure by cooperation of an elongated slot in the cutter element and a shaft carried by said other ring structure.

7. The tool as claimed in claim 6 wherein each said cutter is pivotally connected to the inner ring structure and said cutter edge is a sharpened surface that defines a curve of uniform radius that is eccentric with respect to the axis of that pivot connection.

8. The tool as claimed in claim 7 and further including discs coupled to the outer ring structure for maintaining the concentric relation of said inner and outer ring structures as said ring structures are rotated relative to one another.

9. The tool as claimed in claim 8 wherein both of said ring structures comprise rigid arcuate segments.

10. The tool as claimed in claim 9 and further including a hinge structure connecting said rigid segments of each said ring structure, and a latch structure for securing said rigid segments together in ring configuration.

References Cited

UNITED STATES PATENTS 3,309,002 3/1967 Enos _____ 225—103 X
3,347,431 10/1967 Breisch _____ 225—103

JAMES M. MEISTER, Primary Examiner

U.S. Cl. X.R.

30—92